United States Patent [19]

Young

[11] Patent Number: 4,749,141

[45] Date of Patent: Jun. 7, 1988

[54] SEAT BELT RETRACTING AND WINDING DEVICE

[76] Inventor: Kwon K. Young, ChuKong Apt., Block No. 402, Room 504, Doonchon-Gong, Kangdong-Ku, Seoul, Rep. of Korea

[21] Appl. No.: 77,150

[22] Filed: Jul. 24, 1987

[30] Foreign Application Priority Data

May 16, 1987 [KR] Rep. of Korea ............................ 4861

[51] Int. Cl.$^4$ ............................................. B60R 22/44
[52] U.S. Cl. ............................ 242/107; 242/107.4 R
[58] Field of Search ..................... 242/107, 107.4 R; 280/806, 807; 297/475-478

[56] References Cited

U.S. PATENT DOCUMENTS

| | | | |
|---|---|---|---|
| 4,123,013 | 10/1978 | Bottrill et al. | 242/107 |
| 4,215,830 | 8/1980 | Cunningham | 242/107 |
| 4,382,563 | 5/1983 | Morita et al. | 242/107 |
| 4,383,658 | 5/1983 | Morita et al. | 242/107 |

Primary Examiner—John M. Jillions
Attorney, Agent, or Firm—Pennie & Edmonds

[57] ABSTRACT

The invention relates to a device for automatically retracting and winding up a seat belt for use in a vehicle to protect the occupant and in particular the device controls the force for retracting or winding up the seat belt. The device includes a frame with a winding reel rotatably supported by the frame with spring means connecting the frame and winding reel. The winding reel is adapted to wind thereon a seat belt with a spring force of at least one main and auxiliary springs with a spur gear rotatably supported by the winding reel and operatively interposed between the main and auxiliary springs for changing the winding force and means for detecting a wound quantity of the seat belt.

2 Claims, 3 Drawing Sheets

SEAT BELT RETRACTING AND WINDING DEVICE

BACKGROUND OF THE INVENTION

1. Field of the Invention

This invention relates to a device for retracting and winding up automatically a seat belt used in a vehicle to protect the occupant, and more particularly to a mechanism for controlling the force for retracting or winding up the seat belt.

2. Description of the Related Art

There have conventionally been known seat belt retracting and winding devices which contain a winding reel and spring means having one end connected to the winding reel and the other end connected to a frame of the device. This spring means is constituted by two spiral springs connected to each other through an interposed ratchet means. These devices control the combined spring force of the two springs in dependence on whether a pawl is engaged with the ratchet means or not, thereby exerting a reduced retracting and winding force to the seat belt after it has been fastened across the vehicle occupant.

Devices of this type are known from U.S. Pat. No. 4,382,563 entitled "Seat Belt Winding and Retracting Apparatus" and from U.S. Pat. No. 4,383,658, entitled "Seat Belt Retracting and Winding Devie". According to the former patent, electromagnetic means selectively actuates the pawl so that the starting condition which a reduced retracting and winding force is exerted to the seat belt, may adjust in dependence on the states of the vehicle or physique of the occupant, while the occupant needs to manually operate a switch for energizing the electromagnetic actuator means and the reliability in operation is inferior to the latter patent. A disadvantage of the latter patent is that means for controlling the pawl is complex and difficult to be manufactured. A further disadvantage of the latter patent is that the starting condition which a reduced retracting and winding force is exerted to the seat belt, is hardly adjustable in dependence on the states of the vehicle or physique of the occupant.

SUMMARY OF THE INVENTION

An object of this invention is to provide a seat belt retracting and winding device in which a reduced retracting and winding force is automatically exerted to the seat belt after it has been fastened across the vehicle occupant.

Another obJect of the invention is to provide a seat belt retracting and winding device which is readily manufactured and is reliable in operation.

Still another object of the invention is to provide a seat belt retracting and winding device in which the starting condition which a reduced retracting and winding force is exerted to the seat belt, can adjust in dependeance on the states of a vehicle or physique of the occupant.

With above objects in view, there is provided according to an aspect of this invention a seat belt retracting and winding device which comprises a winding reel rotatably supported by a frame of the device; spring means connected between the frame and the winding reel and including a main spring and an auxiliary spring; the winding reel being adapted to wind thereon a seat belt with a spring force of at least one of the main and auxiliary springs; a spur gear rotatably supported by the winding reel and operatively interposed between the main and auxiliary springs for changing seat belt winding force influenced by the main and auxiliary springs; means for detecting a wound quantity of the seat belt disposed on the wound seat belt; and a gear for fixing the spur gear and being interlocked with the detecting means, the fixing gear being mounted for movement to releasably engage with the spur gear, the detecting means being adapted to cause the fixing gear to operate selectively under an engagement condition with said spur gear and a disengagement condition from the spur gear, exerting smaller and larger spring forces, respectively, on the seat belt, whereby the winding force exerted on the seat belt is reduced when the spring means is operated under the engagement condition.

The detecting means preferably includes a drum rotatably and detachably supported by a shaft of the fixing gear, the drum being adapted to roll on the wound seat belt around the winding reel during its retraction.

BRIEF DESCRIPTION OF THE DRAWINGS

These and other obJects as well as advantages of this invention will become more apparent from description of a preferred embodiment of this invention with reference to the accompanying drawings, in which.

DESCRIPTION OF THE PREFERRED EMBODIMENT

Figure 1:
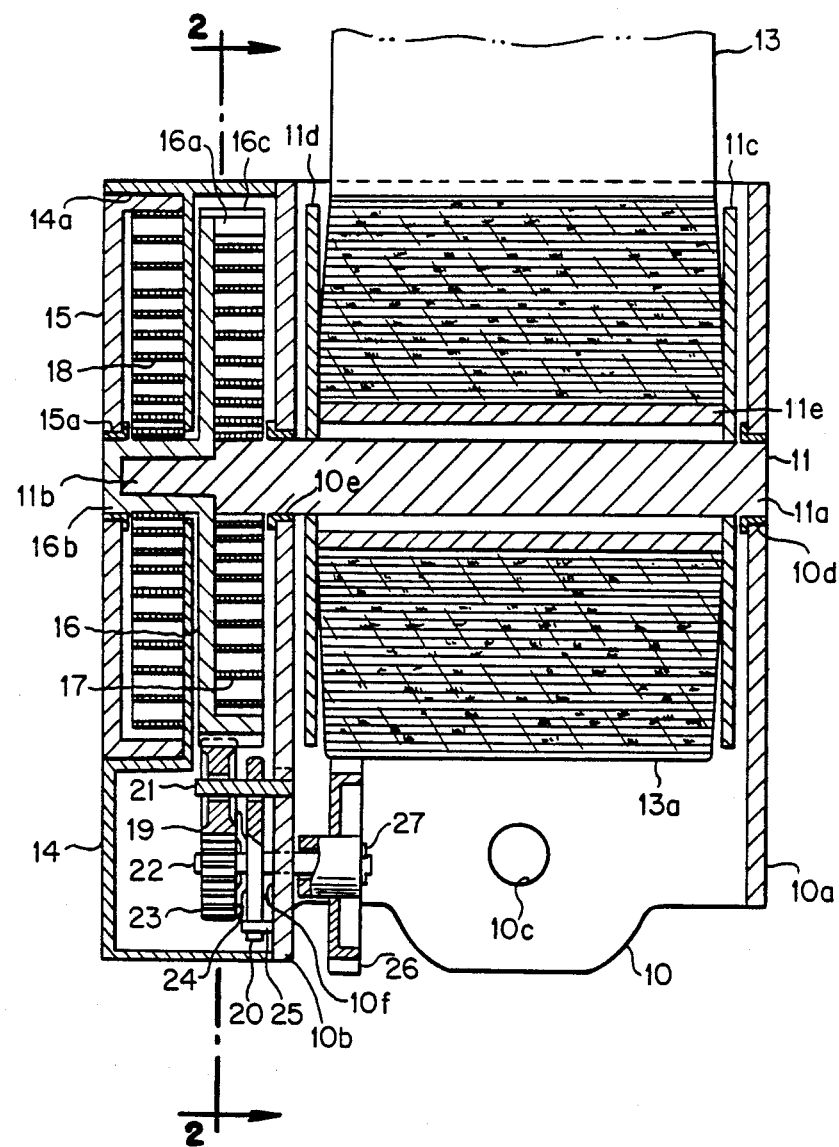
FIG. 1 is a sectional view taken on line I—I of FIG. 2, illustrating an embodiment of a seat belt retracting and winding device according to this invention.
Figure 2:
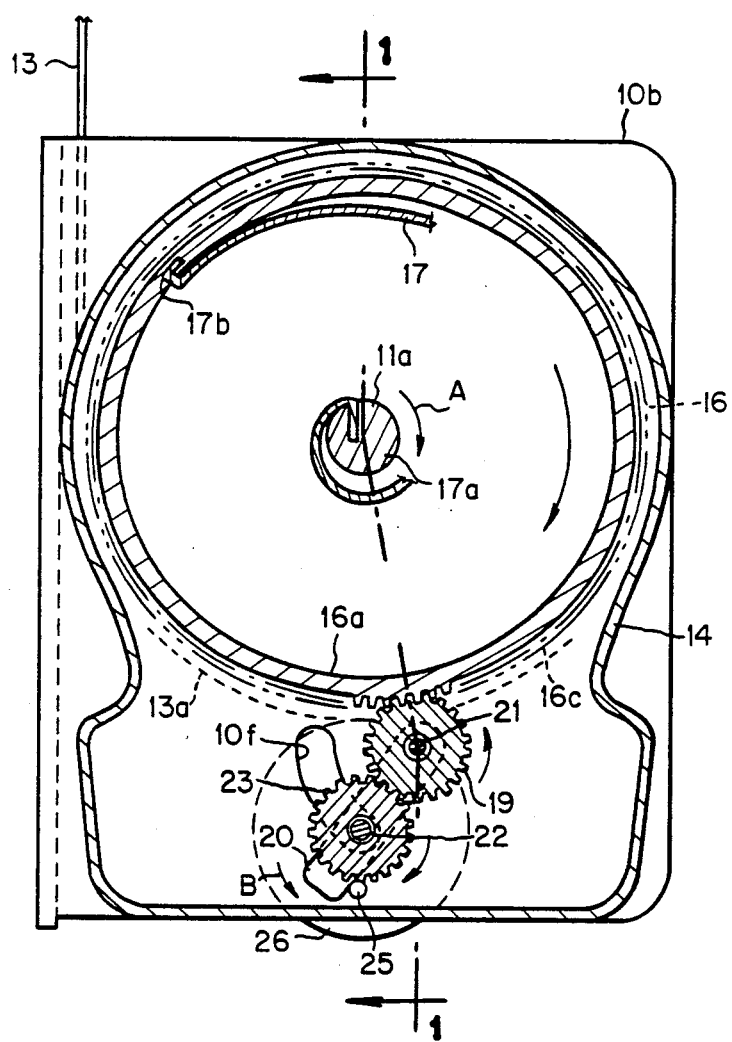
FIG. 2 is a cross sectional view taken on line II—II of FIG. 1 with some parts removed, illustrating the disengagement of a fixing gear from a spur gear when a seat belt is completely retracted and wound on a winding reel.
Figure 3:
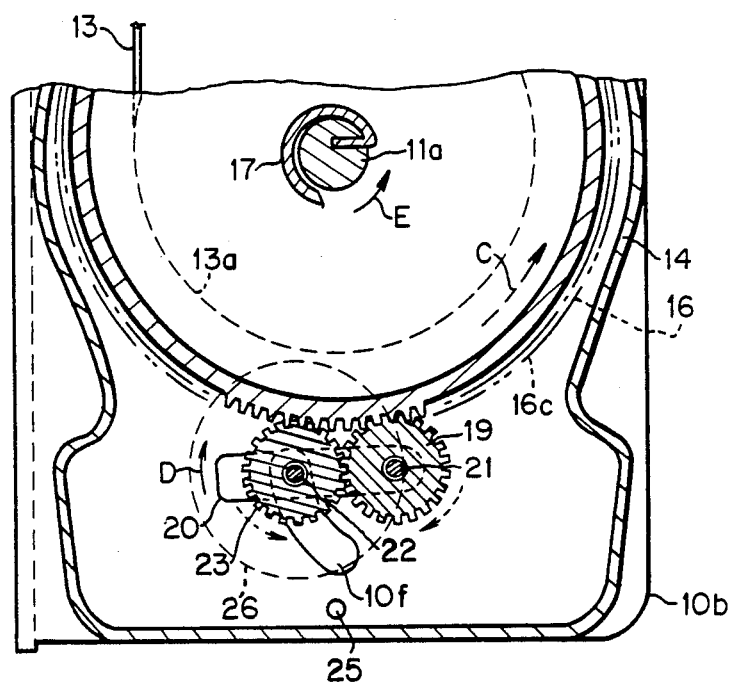
FIG. 3 is a partially sectional view similar to FIG. 2, illustrating the engagement of the fixing gear with the spur gear after the seat belt has been fastened.

Referring to FIGS. 1, 2 and 3, a frame 10, which is the main body of a seat belt retracting device according to this invention, is formed by the press operation from a thick steel plate, and has side plates 10a and 10b and a mounting hole 10c for anchoring the frame 10 to the floor of an automotive vehicle. A main shaft 11a of a winding reel 11 is rotatably supported in bush bearings 10d and 10e made of Teflon or the like and attached to the side plates 10a and 10b. A small shaft 11b is provided at one end of the main shaft 11a. The reel 11 includes flanges 11c and 11d and a spool 11e made integral with the shafts 11a and 11b. The inner end of a seat belt 13 is securely attached to the spool 11e while the other end is attached to an anchor or a buckle (not shown).

A case 14, which is molded from suitable synthetic resin, is attached to the side plate 10b of the frame 10. The case 14 has a cylindrical housing 14a at the outside thereof in which a spring cover 15 is secured. A cup-shaped spur gear 16 includes a large diameter cylindrical section 16a and a small-diameter cylindrical section 16b, the latter being rotatably supported on the shaft 11b and in a bush bearing 15a attached to a center hole of the spring cover 15. Gear teeth 16c are formed around the outer periphery of the large-diameter section 16a. One end 17a of an auxiliary spiral spring 17, which is disposed inside the large-diameter section 16a, is fixed to the main shaft 11a (See FIG. 2) while the other end 17b is fixed to the inner wall of the large-diameter section 16a. One end of a main spiral spring 18, which is housed within the spring cover 15, is fixed to the small-diameter section 16b while the other end is fixed to the inner wall of the spring cover 15 so that when the spur gear 16 is rotated, the main spring 18 is wound around the small-diameter section 16b. The spring force of the auxiliary spring 17 is weaker than that of the main spring 18.

An intermediate gear 19 engages with the spur gear 16. The intermediate gear 19 and a lever 20 are rotatably carried by a shaft 21 fixed at the side plate 10b. The lever 20 has a shaft 22 secured thereto and penetrating an arc-shaped hole 10f of the side plate 10b (See FIG. 2). A gear 23 for fixing the spur gear 16 is rotatably supported at one end of the shaft 22 and engages with the intermediate gear 19. Thus the fixing ger 23 can revolve around the intermediate gear 19 whereby the lever 20 swings in the hole 10f. A friction washer 24 is carried by the shaft 22 between the fixing gear 23 and the lever 20. The fixing gear 23 is adapted to fix the spur gear 16 in engagement therewith where the lever 20 swings to the upper end of the hole 10f (See FIG. 3). The lever 20 is adapted to stop at a pin 25 fixed to the side plate 10b where the lever 20 swings to the lower end of the hole 10f (See FIG. 2). A drum 26 is rotatably and detachably supported and retained by a ring 27 at the other end (on the side of the reel 11) of the shaft 22. The drum 26 is adapted to roll on the seat belt 13a wound around the spool 11e during its retraction so as to detect a wound quantity of the seat belt.

In operation, when the seat belt 13 is retracted and wound around the reel 11, the wound belt 13a forces down the drum 26. Because the fixing gear 23 is in disengagement from the spur gear 16, the gears 23, 19 and 16 are rotatable so that the belt 13 is completely wound around the reel 11 under the combined winding force of the springs 18 and 17 as shown in FIGS. 1 and 2.

As indicated by arrows in FIG. 2, when the occupant pays out the belt 13, the latter is unwound from the reel 11 so that the shaft 11a is rotated. As the belt 13 is paid out, the gears 16, 19 and 23 are also rotated, and both the auxiliary and main springs 17 and 18 are wound. The spring constant of the main spring 18 is larger than that of the auxiliary spring 17 so that first the auxiliary spring 17 is almost wound. After the auxiliary spring 17 has been wound, the rotation in the direction indicated by the arrow A in FIG. 2 of the shaft 11a is transmitted to the small-diameter section 16b of the spur gear 16 through the wound auxiliary spring 17 so that the main spring 18 is wound. Because of the friction washer 24, the lever 20 swings in the direction B thereby stopping at the pin 25. The position of the pin 25 is so selected that when the belt 13 is fully paid out, the drum 26 is in disengagement from the wound belt 13a. Therefore the wound belt 13a is in the position shown in FIG. 3 when the belt 13 is fully paid out and fastened. The drum 26 is changeable for a smaller drum, if the drum 26 contacts the wound belt 13a even when the belt 13 is fully paid out and fastened. On the contrary the drum 26 is changeable for a larger drum.

Thus, when the seat belt 13 is fastened, the unwinding spring force of the main spring 18 is exerted to the spur gear 16 in the direction C in FIG. 3 so that the gears 19 and 23 are rotated in the direction indicated by the dotted arrows in FIG. 3, and the lever 20 swings in the direction D. Consequently, the fixing gear 23 comes to engage with the spur gear 16 thereby fixing it. The fixation of the spur gear 16 automatically prevents the unwinding spring force of the main spring 18 from transmitting to the shaft 11a. As a result, the tension of the belt is reduced when the belt fastened so that the occupant has less feeling of being restrained.

When the belt 13 is unfastened or released, the shaft 11a is slowly rotated in the direction E under the unwinding spring force of the auxiliary spring 17. As the belt 13 is wound, the wound quantity of the belt 13 increases. Therefore the wound belt 13a contacts the drum 26 and lowers the drum 26 and the lever 20. The fixing gear 23 is therefore disengaged from the teeth 16c of the spur gear 16, so that that spur gear 16 initiates rotation in the direction C under the unwinding spring force of the main spring 18. Then, the rotation of the spur gear 16 is automatically transmitted to the shaft 11a through the auxiliary spring 17, and in addition to the unwinding spring force of the auxiliary spring 17, the unwinding spring force of the main spring 18 rotates the reel 11 to retract and wind the belt 13 around the reel 11.

What is claimed is:

1. A seat belt retracting and winding device comprising:

a frame;

a winding reel rotatably supported by said frame;

spring means connected between said frame and said winding reel and including a main spring and an auxiliary spring;

said winding reel winding thereon a seat belt with a spring force of at least one of said main and auxiliary springs;

a spur gear rotatably supported by said winding reel and operatively interposed between said main and auxiliary springs;

means for detecting a wound quantity of said seat belt disposed on said wound seat belt;

a fixing gear for fixing said spur gear and being interlocked with said detecting means;

and means mounting said fixing gear for movement to releasably engage with said spur gear in response to said detecting means;

said detecting means causing said fixing gear to operate selectively under an engagement condition for preventing rotation of said spur gear with said spur gear and a disengagement condition from said spur gear for allowing rotation of said spur gear, thereby exerting smaller and larger spring forces, respectively, on said seat belt, whereby the winding force exerted on said seat belt is reduced when said spring means is operated under said engagement condition.

2. A device as in claim 1 wherein said detecting means includes a drum rotatably and detachably supported by a shaft of said fixing gear, said drum being adapted to roll on said wound seat belt around said winding reel during its retraction.

* * * * *